(12) United States Patent
Wagner et al.

(10) Patent No.: US 7,903,262 B2
(45) Date of Patent: Mar. 8, 2011

(54) OPTICAL POSITION MEASURING ARRANGEMENT

(75) Inventors: Johannes Wagner, Taching/Tengling (DE); Sebastian Gries, Bergen (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 182 days.

(21) Appl. No.: 12/290,769

(22) Filed: Nov. 3, 2008

(65) Prior Publication Data

US 2009/0135436 A1    May 28, 2009

(30) Foreign Application Priority Data

Nov. 23, 2007  (DE) .......................... 10 2007 056 612

(51) Int. Cl.
*G01B 11/14*    (2006.01)

(52) U.S. Cl. ......................................... 356/616

(58) Field of Classification Search ........... 356/600–640
See application file for complete search history.

(56) References Cited

U.S. PATENT DOCUMENTS

| | | | |
|---|---|---|---|
| 3,982,106 A | 9/1976 | Stutz | |
| 4,451,731 A * | 5/1984 | Leonard | 250/231.14 |
| 4,477,189 A * | 10/1984 | Ernst | 356/619 |
| 4,519,140 A | 5/1985 | Schmitt | |
| 4,654,527 A | 3/1987 | Schmitt | |
| 5,013,910 A * | 5/1991 | Epstein | 250/231.17 |
| 5,065,017 A * | 11/1991 | Hoech | 250/231.17 |
| 5,129,725 A * | 7/1992 | Ishizuka et al. | 356/617 |
| 5,783,817 A * | 7/1998 | Gohring | 250/231.14 |
| 6,175,414 B1 * | 1/2001 | Holzapfel et al. | 356/620 |
| 7,057,161 B2 * | 6/2006 | Gruber et al. | 250/231.14 |
| 2003/0016369 A1 * | 1/2003 | Benner et al. | 356/616 |

FOREIGN PATENT DOCUMENTS

| | | |
|---|---|---|
| DE | 31 44 334 A1 | 5/1983 |
| DE | 20 2005 002 622 U1 | 8/2006 |
| EP | 0 118 673 A2 | 9/1984 |

* cited by examiner

*Primary Examiner* — Gregory J Toatley
*Assistant Examiner* — Jarreas C Underwood
(74) *Attorney, Agent, or Firm* — Brinks Hofer Gilson & Lione

(57) ABSTRACT

A position measuring arrangement including a scale connected with a first object, wherein the scale includes a reference marking and a plurality of graduated areas, which are arranged a periodically in the measuring direction and have different optical properties. Respective additional structures are arranged in the measuring direction adjacent to the reference marking, which extend in the measuring direction and minimize secondary maxima in the reference pulse signal, wherein the additional structures includes at least two tracks having a first optical property, between which a graduated area having a second optical property and extending in the measuring direction is arranged. The position measuring arrangement further includes a scanning unit movable in relation to the scale in the measuring direction and is connected with a second object, the scanning unit includes individual detector elements, whose geometric arrangement is matched to the reference marking for generating the reference pulse signal.

7 Claims, 5 Drawing Sheets

OPTICAL POSITION MEASURING ARRANGEMENT

RELATED APPLICATIONS

Applicants claim, under 35 U.S.C. §119, the benefit of priority of the filing date of Nov. 23, 2007 of a German patent application, copy attached, Serial Number 10 2007 056 612.5, filed on the aforementioned date, the entire contents of which is incorporated herein by reference.

BACKGROUND

1. Technical Field

The present invention relates to an optical position measuring arrangement suitable for determining the relative position of two objects, which are movable in relation to each other, and provides a reference pulse signal at least one reference position along the measuring track.

2. Background Information

For determining the relative position of two objects which are movable in relation to each other, known incremental position measuring arrangements contain an incremental graduation track as a part of a scale. For generating incremental signals, the incremental graduation track is scanned by a scanning unit, which is movable in at least one measuring direction. Moreover, for providing an absolute relationship, such position measuring arrangements have the possibility of generating reference pulse signals at defined, or respectively predetermined reference positions along the measuring track. For this purpose a further track is arranged at one or several predetermined reference positions on the part of the scale, for example adjoining the incremental graduation track. The reference markings customarily include a plurality of graduated areas, which are a periodically arranged in the measuring direction and have different optical properties. In the case of incident light scanning, these are perhaps graduated areas of different reflectivity, in the case of transmitted light scanning the graduated areas are of different transparency.

The scanning unit which, with respect to the scale, is movable in the measuring direction, is connected with the respectively other object and includes a light source, a reference pulse detector arrangement, as well as further components, as required, for incremental signal generation, however, the latter are of no further importance in the present connection. The reference pulse detector arrangement includes individual opto-electronic detector elements, whose geometric arrangement is matched to the reference markings for generating a reference pulse signal. Customarily, the reference pulse detector arrangement here has the same structure as the reference marking.

When passing over the reference marking, a signal maximum of the reference pulse now results in such a position measuring arrangement at the respective reference position. More or less pronounced secondary maxima of the reference pulse signal exist in the areas adjacent to the reference position. In the case of particularly strongly pronounced secondary maxima, a certain uncertainty regarding the detection of the actual signal maximum at the reference position exists because of the reduced interference spacing between a base signal level and the signal maximum.

For solving this problem it has already been proposed in U.S. Pat. No. 4,451,731, the entire contents of which are incorporated herein by reference, or respectively in DE 20 2005 002 622 U1, to provide further structural elements, or respectively additional structural elements, on the scale adjacent to the actual reference marking for repressing secondary maxima in the resulting reference pulse signal. Here, the additional structures employed for this includes non-reflective or opaque lines adjacent to the reference marking which, in certain scanning configurations, assure damping of the secondary maxima of the reference pulse signal.

OBJECTS AND SUMMARY OF THE INVENTION

It is an object of the present invention to disclose a position measuring arrangement which makes possible a further improved generation of a reference pulse signal at one or several reference positions along the measuring track, and in particular assures a dependable detection thereof in this case.

This object is attained by a position measuring arrangement for determining relative positions of a first object and a second object, which are movable with respect to each other in a measuring direction, wherein a reference pulse signal can be generated in at least a reference position. The optical position measuring arrangement including a scale connected with the first object, wherein the scale includes a reference marking at the reference position and a plurality of graduated areas, which are arranged aperiodically in the measuring direction and have different optical properties. Respective additional structures are arranged in the measuring direction adjacent to the reference marking, which extend in the measuring direction and minimize secondary maxima in the reference pulse signal, wherein the additional structures includes at least two tracks having a first optical property, between which a graduated area having a second optical property and extending in the measuring direction is arranged. The position measuring arrangement further includes a scanning unit movable in relation to the scale in the measuring direction and is connected with the second object, the scanning unit includes a light source and a reference pulse detector arrangement having individual detector elements, whose geometric arrangement is matched to the reference marking for generating the reference pulse signal.

In accordance with the present invention it is now provided that the additional structures for damping the secondary maxima include at least two tracks having a first optical property, between which a graduated area extending in the measuring direction and having a second optical property is arranged. In the case of a transmitted light system, the optical properties 1) non-transparent (first optical property), or respectively 2) transparent (second optical property), should be selected, and in an also possible incident light system the properties slightly reflecting (first optical property), or respectively more reflecting (second optical property) should be selected.

An optical position measuring arrangement in accordance with the present invention is disclosed, which is used for determining the relative position of two objects which are movable with respect to each other in the measuring direction, in which a reference pulse signal can be generated at least one defined reference position. The position measuring arrangement includes a scale connected with one of the two objects and has a reference marking at the reference position, which includes a plurality of graduated areas with different optical properties, which are aperiodically arranged in the measuring direction. Respective additional structures are arranged in the measuring direction adjacent to the reference marking, which extend in the measuring direction and minimize the secondary maxima in the resulting reference pulse signal. The position measuring arrangement furthermore includes a scanning unit, which can be moved in the measuring direction in relation to the scale, is connected with the other object and has a light source and a reference pulse detector arrangement having individual detector units, whose geometric arrangement is adapted to the reference marking for generating a reference pulse signal. The additional structures include at least two tracks with a first optical property, between which a graduated area extending in the measuring direction extends, which has a second optical property.

The graduated area extending in the measuring direction is preferably arranged between the two tracks in such a way that the detector elements of the reference pulse detector arrangement can be charged with light via the graduated area.

The optical properties can be selected in accordance with one of the two following variants:
 a) the first optical property transparent, the second optical property non-transparent, or
 b) the first optical property highly reflective, the second optical property slightly reflective.

It is possible for the scale to be embodied as a graduated disk, having at least one incremental graduation track, which has been arranged in the form of a circle on the graduated disk, as well as a reference marking track, which is arranged concentrically to it, in which the reference marking is arranged in the reference marking track at least one location, and two non-transparent tracks are formed in the remaining area of the reference marking track, between which a graduated area is arranged, which extends in the measuring direction.

It is furthermore possible for several rectangular-shaped damping areas, having the first optical property, to be introduced into the tracks and to extend perpendicularly with respect to the measuring direction.

Here, the damping areas introduced into the tracks can be arranged in a mirror-symmetrical manner with respect to the reference marking.

The damping areas, which have been additionally introduced into the tracks, are here preferably arranged in such a way that further damping of the secondary maxima in the resulting reference pulse signals results from them.

The measures in accordance with the present invention can of course be employed in connections with linear, as well as rotary position measuring arrangements. In the same way it is possible to realize incident, as well as transmitted light scanning. The result in all cases is a reference pulse signal with minimized secondary maxima, whose signal maximum can be dependably detected at the reference position.

Further advantages, as well as details of the position measuring arrangement in accordance with the present invention ensue from the following description of an exemplary embodiment by the attached drawings.

BRIEF DESCRIPTION OF THE DRAWINGS

FIG. 2b is an enlarged partial view of a detail of the graduated disk of FIG. 2a;

DETAILED DESCRIPTION OF THE PREFERRED EMBODIMENTS

Figure 1:
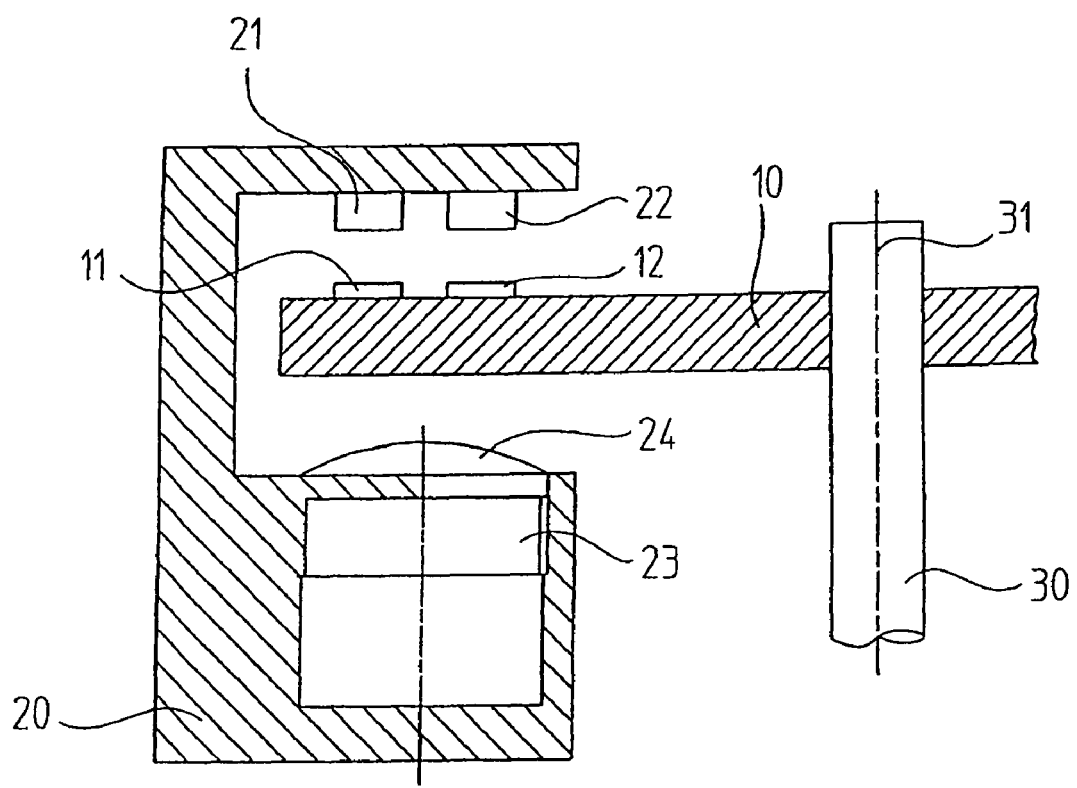
FIG. 1 represents a possible scanning beam path in an exemplary embodiment of an optical position measuring arrangement in accordance with the present invention in a schematized sectional view.

The scanning beam path of an exemplary embodiment of the position measuring arrangement in accordance with the present invention, designed as a rotary transmitted light system, will be explained in what follows by the schematized sectional view in FIG. 1, together with FIGS. 2a, 2b and 3; the latter figures show, also in a schematized form, plan views of the scale, or respectively partial views thereof, as well as the detector plane of the position measuring arrangement in FIG. 1.

The represented position measuring arrangement is used for generating position information regarding the relative movement of an object, not represented in the drawing figures, rotating around the axis 31. Such an arrangement can find employment for example in machine tools or electrical drive mechanisms, and there provides position information regarding the rotating object to an upper level control unit.

In the represented exemplary embodiment of a rotary position measuring arrangement, the latter includes, for one, a scale 10 in the form of a graduated disk, on which an incremental measuring graduation 11.1, arranged in the form of a circle around the axis 31, is arranged in an incremental graduation track 11, as well as of at least one reference marking 12.1 at a reference position $x_{REF}$ in a reference marking track 12. The reference marking track 12 is arranged with respect to the axis 31 concentrically to the incremental reference marking track 11.

The measuring graduation 11.1 includes alternatingly arranged graduated areas of different optical properties, each of which is rectangularly designed. Thus, in the present example of a transmitted light scanning process, the graduated areas are designed to be transparent (first optical property) and non-transparent (second optical property); in the drawing figures the non-transparent graduated areas are provided with cross-hatching, the transparent graduated areas do not have cross-hatching. For example, the non-transparent areas can be provided with a chromium coating, while the transparent areas are embodied as corresponding window areas in a support substrate made of glass. The width of two adjoining graduation areas (transparent, non-transparent) in the measuring direction x is to be called the graduation period $TP_M$ of the measuring graduation 11.1. The graduated disk is arranged centered on a shaft 30 rotating around the axis 31 and is made of glass or plastic. The shaft 30 is connected with a rotating object, for example with the shaft of an electrical drive mechanism.

The represented position measuring arrangement further includes a scanning unit 20 which, in the present example, is arranged stationary with respect to the graduated disk 10, which rotates in the circumferential direction, or respectively in the measuring direction x. Parts of the scanning unit 20 are, inter alia, a light source 23 with an optical collimator device 24 arranged upstream thereof, as well as an incremental signal detector arrangement 21 and a reference pulse detector arrangement 22. By the way, the two detector arrangements 21, 22 are customarily designed integrated into a so-called opto-ASIC, in which, besides signal detection, further signal processing, or respectively signal editing, takes place.

In the represented exemplary embodiment with so-called transmitted light scanning, the graduated disk 10 with the incremental and the reference marking tracks 11, 12 is arranged between the light source 23 and the detector arrangements 21, 22. After directing beams through the structures in the incremental and in the reference marking tracks 11, 12, corresponding patterns result as cast shadows in the detection plane, which are detected by the incremental signal detector arrangement 21 and a reference signal detector arrangement 22 and are converted into signals which can be further processed.

In the case of incremental signal generation, a periodic strip pattern is generated in the detector plane, for example in the known manner, which is detected by an incremental signal detector arrangement 21 in a photo-diode array and is converted into a pair of incremental signals $INC_A$, $INC_B$, which are modulated as a function of a displacement and are offset from each other by a 90° phase.

For producing an absolute relationship in the course of the position measurement, a reference marking 12.1 is arranged at least one defined reference position $x_{REF}$ in the reference marking track 12. By this a reference signal RI is generated at the reference position $x_{REF}$, which thus constitutes a reference for the higher resolving (absolute) incremental signals $INC_A$, $INC_B$.

Figure 2A:
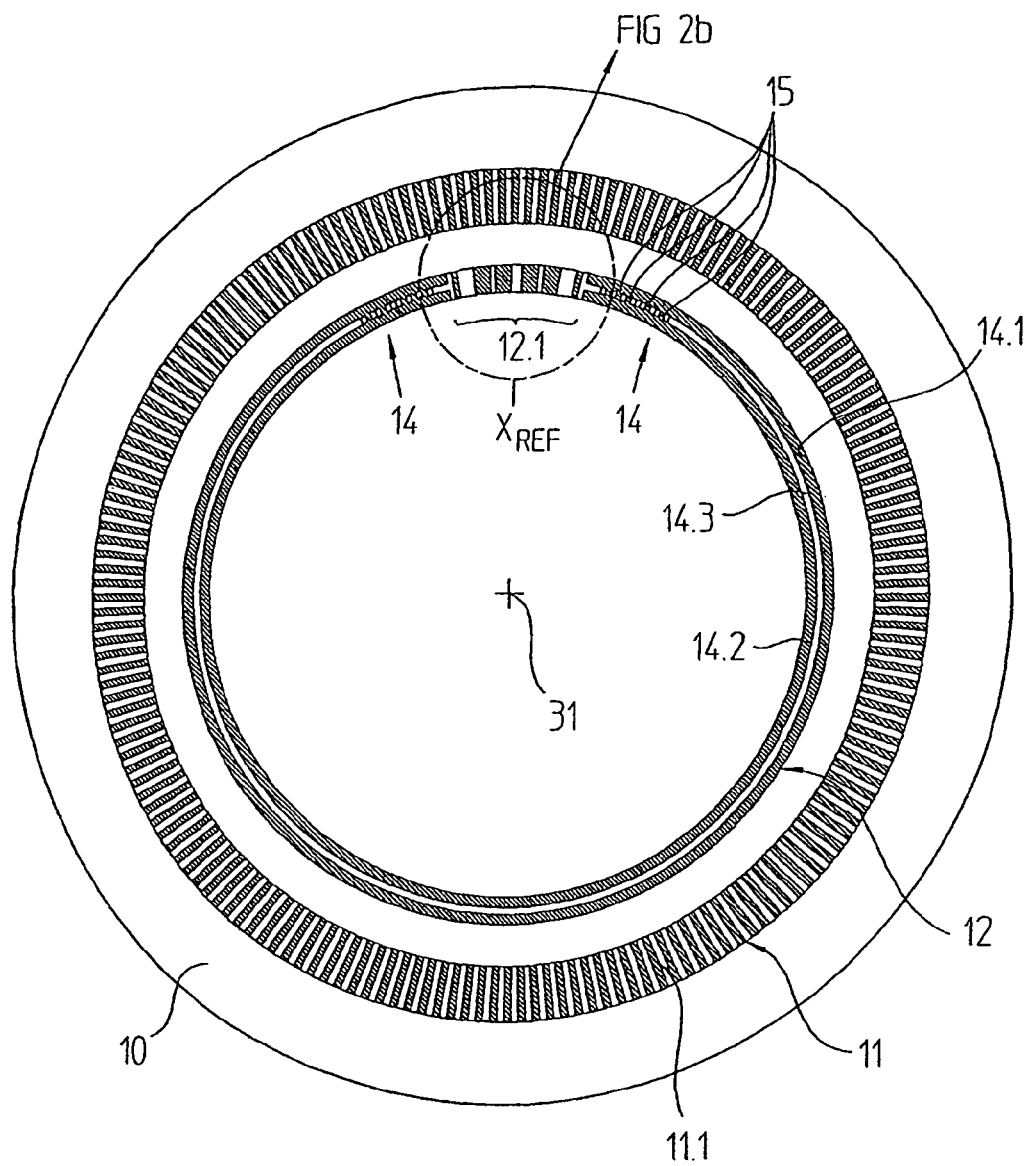
FIG. 2a is a view from above on an embodiment of a graduated disk of the position measuring arrangement of FIG. 1 in accordance with the present invention.
Figure 2B:
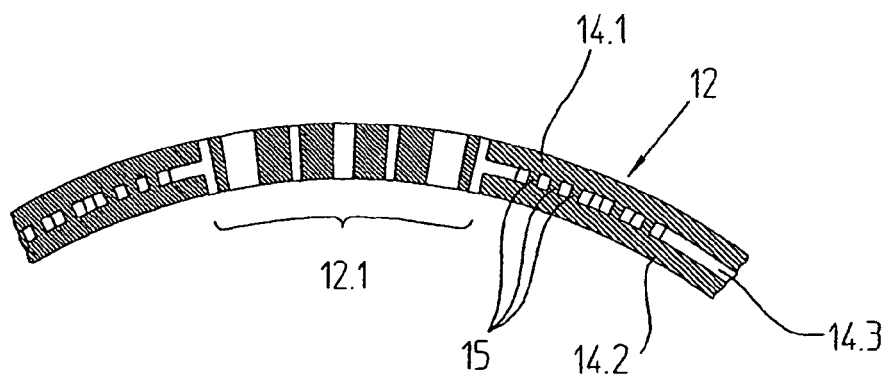

As can be seen for example in the representation of the enlarged detail view in FIG. 2b, the reference marking 12.1 at the reference position $x_{REF}$ includes a multitude of graduated areas, which are arranged aperiodically in the measuring direction x and have different first and second optical properties. In the instant example of transmitted light scanning, the graduated areas of the reference marking 12.1 which are not cross-hatched in the drawings are embodied to be transparent, for example, however, the dotted areas and graduated areas on the graduated disk 10 are not transparent. In accordance with the present invention, further additional structures 14 are arranged in the reference marking track 12 laterally adjacent to the reference marking 12.1, whose actual embodiment, or respectively design, will be addressed in greater detail in the course of the following description.

It is of course possible to provide still further such reference markings 12.1 along the respective measuring track, or respectively along the scanned circumference of the graduated disk, at defined positions adjacent to the incremental graduation 11.1. For example, so-called spacing-coded reference markings can be arranged.

A geometric arrangement of detector elements is provided in the reference detector arrangement 22, matched to the respective embodiment of the reference marking 12.1 in such a way that it is matched to the structure of the reference marking 12.1. FIG. 3 shows a portion of the detection plane with a total of nine rectangularly-shaped detector elements 22.1 to 22.9, whose arrangement is matched to that of the transparent graduated areas of the reference marking 12.1 on the scale, or respectively the graduated disk 10. As indicated in FIG. 3, the graduated signals resulting at the detector elements 22.1 to 22.9 are supplied to an input of a current-voltage converter 25; a reference voltage $V_{ref}$ is applied to a second input of the current-voltage converter 25. The reference pulse signal RI results at the output of the current-voltage converter 25.

As a result, in the course of passing over the reference position $x_{REF}$, the transparent graduated areas of the reference marking 12.1 and the detector elements 22.1 to 22.9 of the reference pulse detector arrangement 22, which are geometrically matched to them, coincide. A signal maximum results at the reference position $x_{REF}$, which is evaluated as the reference pulse signal RI and is further processed.

Figure 4A:
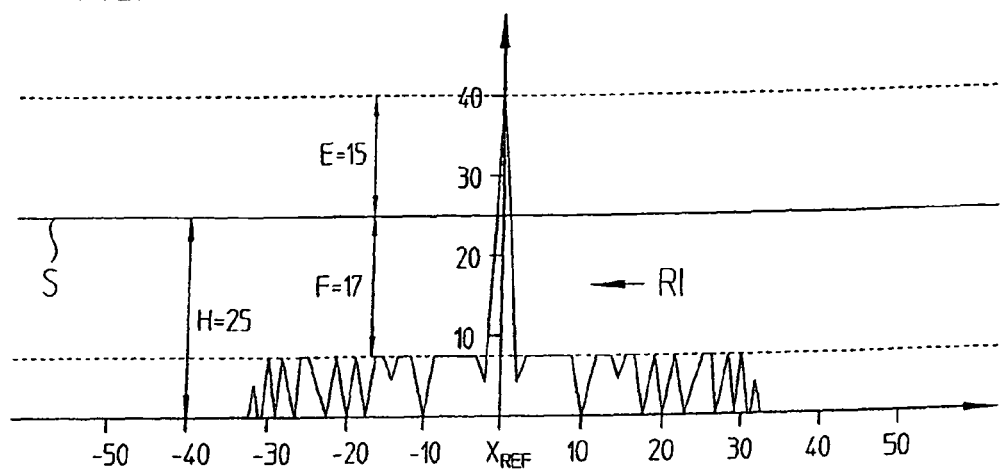
FIGS. 4a to 4e respectively represent different possible signals in connection with reference pulse signal generation by the position measuring arrangement of FIG. 1 in accordance with the present invention.

A reference pulse signal RI at the reference position $x_{REF}$, which results in the ideal case, is represented in FIG. 4a. A switching threshold S, which is used for generating signals which can be further processed from the reference pulse signal RI, as well as different values E, F, H, which are of importance with respect to a dependable detection of the reference pulse signal RI, as will be explained in what follows, are also drawn in FIG. 4a. In this connection it is particularly important for a dependable detection of the reference pulse signal RI that the signal maximum at the reference position $x_{REF}$ is sufficiently strong with respect to the adjacent secondary maxima, i.e. that the values E and F in particular are sufficiently large, or respectively that advantageous ratios of the values E to H, or respectively F to H, exist. In the idealized case of FIG. 4a, $E/H=15/25=0.60$, and $F/H=17/25=0.68$.

Figure 4B:
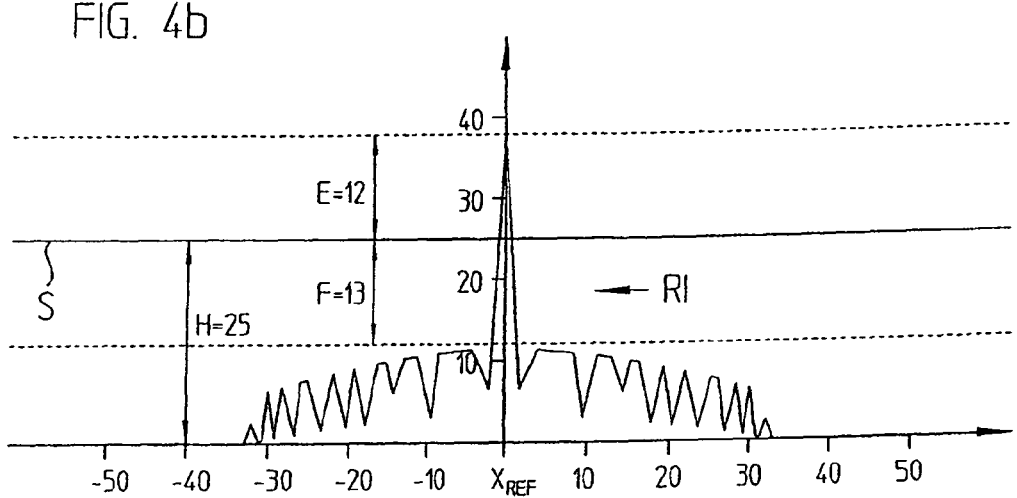

In FIG. 4b, the course of the reference pulse signal RI in the area of the reference position $x_{REF}$ is represented as it results in actuality if no additional structures are arranged on the graduated disk 10 adjacent to the reference marking 12.1. As can be seen in FIG. 4b, because of the shape of the secondary maxima with a bell-shaped enveloping curve adjacent to the reference position $x_{REF}$ in comparison with the ideal case in FIG. 4a, the value F=13 is smaller as in the ideal case in FIG. 4a; in this case the ratio $F/H=13/25=0.52$ is smaller and therefore less advantageous than in the ideal case. Thus, in actuality a reduced detection dependability regarding the reference pulse signal RI would result.

In accordance with the present invention it has therefore been provided to arrange the already mentioned additional structures 14 on the graduated disk 10 laterally adjacent to the reference markings 12.1, which favorable affect the signal shape of the reference pulse signal RI, in particular in the area of the secondary maxima.

As can be seen from FIG. 2a, in this example the additional structures 14 contain two non-transparent tracks 14.1, 14.2 in the reference marking track 12, between which a transparent graduated area 14.3, extending in the circumferential direction, or respectively measuring direction, is arranged. In this case, the transparent graduated area 14.3 is arranged in the center between the two non-transparent tracks 14.1, 14.2. When arranging the transparent graduated area 14.3, care must be taken in principle that it is placed to cover the detector elements 22.1 to 22.9 of the reference pulse signal detector arrangement 22, so that in the area adjacent to the reference position $x_{REF}$ light can reach these detector elements 22.1 to 22.9 through the transparent graduated areas 14.3.

Figure 4C:
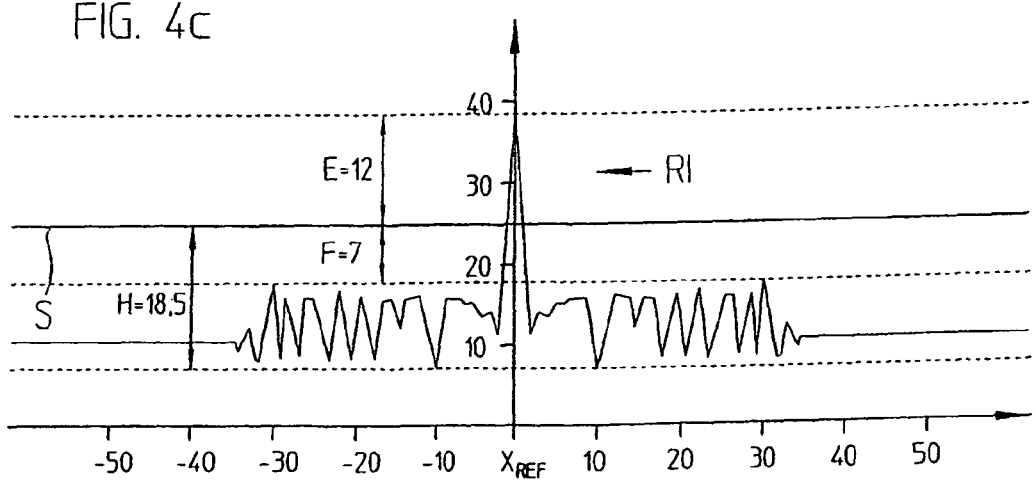

The signal shape of the reference pulse signal RI, such as results in a position measuring arrangement having such additional structures as just explained, is represented in FIG. 4c. It can be clearly seen in FIG. 4c that it is now possible to avoid the previous, unfavorable bell-shaped signal course in the area of the secondary maxima, and that a more advantageous ratio $E/H=0.65$ can be achieved in comparison with FIG. 4b. A further improved signal shape could be achieved here if the reference pulse signal RI were electronically amplified; in this manner it would be possible, perhaps in particular to increase the value E+F in the resulting signal, which would have a further increase of the detection dependability as a result.

Figure 3:
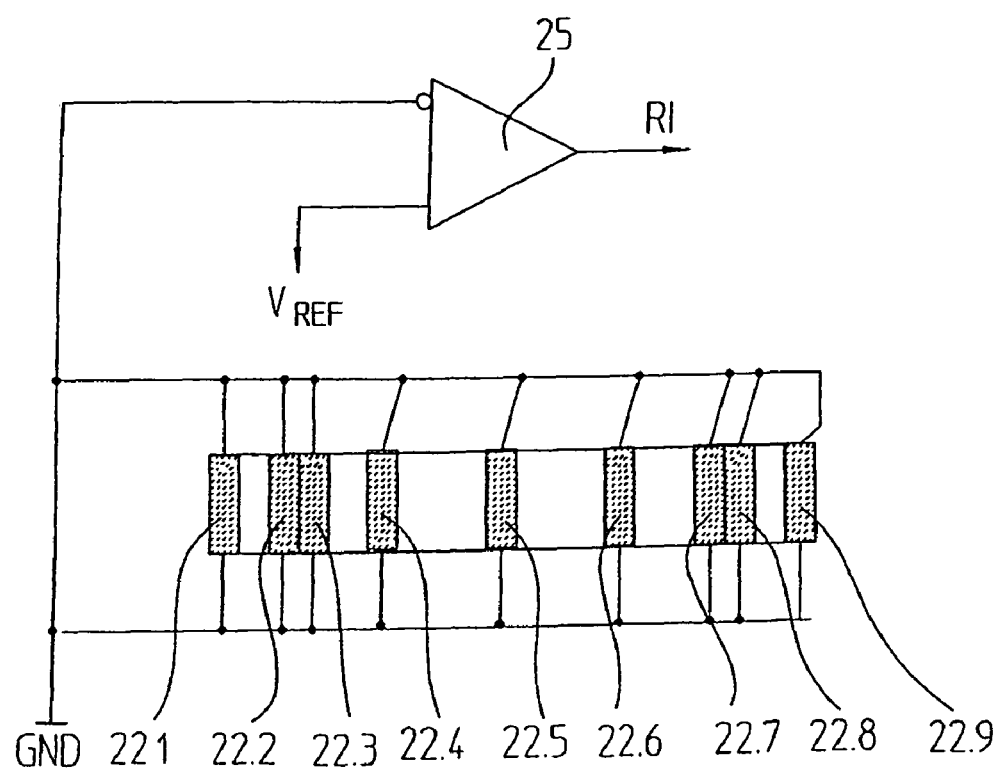
FIG. 3 is a view from above on the detection plane of the position measuring arrangement in FIG. 1, including schematically an embodiment of a suggested switching arrangement for reference pulse generation in accordance with the present invention.
Figure 4D:
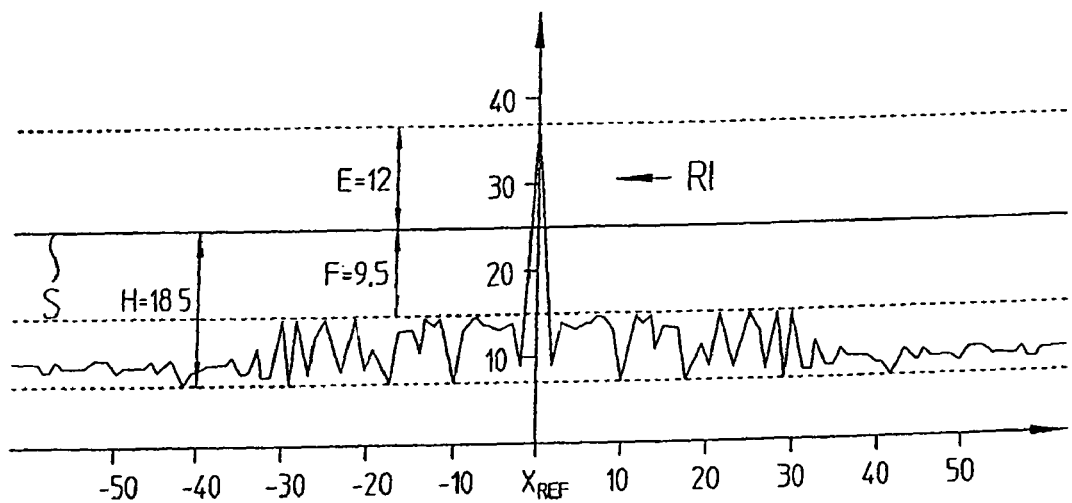

For complementing the steps in accordance with the invention so far explained, i.e. the provision of the additional structures 14, it is further provided in the represented embodiments in FIGS. 1 to 3 to introduce several rectangular-shaped non-transparent damping areas 15 extending perpendicularly in relation to the circumferential direction, or respectively the measuring direction, into the tracks 14.1, 14.2, or respectively the graduated area 14.3, in the area of the additional structures adjacent to the reference marking 12.1. The arrangement of the damping areas 15 in the additional structures 14 here is a result of an optimization method, by which the location, at which the additional damping areas 15 are to be introduced, is determined, in order to assure a still more improved signal shape of the reference pulse signal RI, or respectively the dependability of its detection; in this connection reference is made to the representation in FIG. 2b, which shows the area of the reference marking 12.1 in an enlarged view. The reference pulse signal RI resulting on the basis of these steps is represented in FIG. 4d. Here, further damping, or respectively reduction, of the undesirable secondary maxima in the reference pulse signal RI results because of the additional damping areas 15, which finds its expression in a more favorable ratio F/H=9.5/18.5=0.51 in comparison with the signal course in FIG. 4c. Here, the ratio E/H=0.65, already optimized by the provision of the additional structures 14, remains unchanged. Furthermore, the damping areas 15 are arranged mirror-symmetrically with respect to the reference position $x_{REF}$.

Figure 4E:
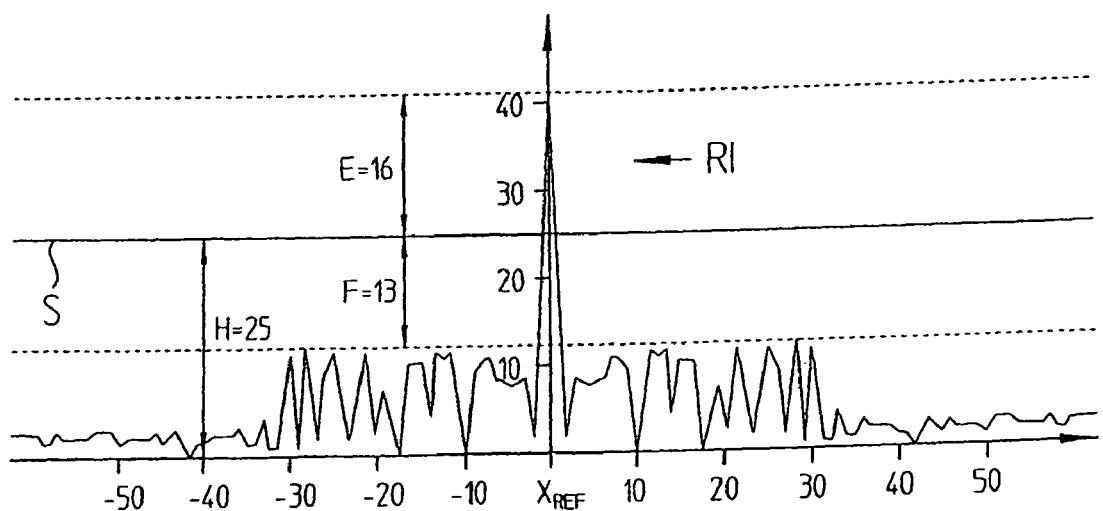

FIG. 4e finally shows a still further optimized signal course of the reference pulse signal RI. Here, the reference pulse signal RI, which had been obtained by means of scanning a reference marking in accordance with the exemplary embodiment in FIGS. 1 to 3, was again electronically amplified, from which larger values of the parameters E, F and H result as a whole, and in this way it is possible to assure an again optimized detection dependability.

Of course, a multitude of further embodiments exists within the framework of the invention.

Alternatively to the represented example it would be possible, for example, to embody the outer tracks 14.1, 14.2 to be transparent, and the center graduated area 14.3 non-transparent.

It is furthermore basically possible to employ the ideas in accordance with the invention also for incident light scanning. In this case the graduating areas of, for example an appropriate measuring graduation, would be embodied to be less reflecting (first optical property) and more reflecting (second optical property). It would accordingly be required to embody the tracks of the additional structures to be less reflecting and the center graduated area to be more reflecting; in this case the additional damping areas would be constituted by less-reflecting graduated areas. In this case, too, it would be possible to embody the tracks of the additional structures, as well as the center graduated area, to be designed in the reverse way.

In the same way it would be possible to embody longitudinal measuring arrangements in this way in place of rotary position measuring arrangements.

The foregoing description is provided to illustrate the present invention, and is not to be construed as a limitation. Numerous additions, substitutions and other changes can be made to the present invention without departing from its scope as set forth in the appended claims.

We claim:

1. An optical position measuring arrangement for determining relative positions of a first object and a second object, which are movable with respect to each other in a measuring direction, wherein a reference pulse signal can be generated in at least a reference position, the optical position measuring arrangement comprising:

a scale connected with said first object, said scale comprises:
  a reference marking at said reference position;
  a plurality of graduated areas, which are arranged aperiodically in said measuring direction and have different optical properties, wherewith respective additional structures are arranged in said measuring direction adjacent to said reference marking, which extend in said measuring direction and minimize secondary maxima in said reference pulse signal, wherein said additional structures comprises two tracks comprising a first optical property, between which a graduated area comprising a second optical property and extending in said measuring direction is arranged, wherein rectangularly-shaped damping areas are introduced into said additional structures and extend perpendicularly in relation to said measuring direction; and
a scanning unit movable in relation to said scale in said measuring direction and is connected with said second object, said scanning unit comprises:
  a light source; and
  a reference pulse detector arrangement comprising detector elements, whose geometric arrangement is matched to said reference marking for generating said reference pulse signal.

2. The optical position measuring arrangement in accordance with claim 1, wherein said graduated area is arranged between said two tracks in such a way that said detector elements are charged with light via said graduated area.

3. The optical position measuring arrangement in accordance with claim 1, wherein said first optical property and said second optical property are selected in accordance with one of the two following variations:
  a) first optical property: transparent, second optical property: non-transparent, or
  b) first optical property: highly reflecting, second optical property: slightly reflecting.

4. The optical position measuring arrangement in accordance with claim 2, wherein said scale is a graduated disk comprising an incremental graduated track arranged in a circular shape on said graduated disk, as well as a reference marking track arranged concentrically thereto, wherein said reference marking is arranged in at least one location in said reference marking track, and two non-transparent tracks are formed in a remaining area of said reference marking track, between which a transparent graduated area is arranged, which extends in said measuring direction.

5. The optical position measuring arrangement in accordance with claim 1, wherein said rectangularly-shaped damping areas are arranged mirror-symmetrically with respect to said reference marking.

6. The optical position measuring arrangement in accordance with claim 1, wherein said rectangularly-shaped damping areas are arranged in such a way so that further damping of said secondary maxima in the resulting reference pulse signal occurs.

7. The optical position measuring arrangement in accordance with claim 5, wherein said rectangularly-shaped damping areas are arranged in such a way so that further damping of said secondary maxima in the resulting reference pulse signal occurs.

* * * * *